March 27, 1934.  H. HOPKES  1,952,985
REFRIGERATOR
Filed Oct. 29, 1932
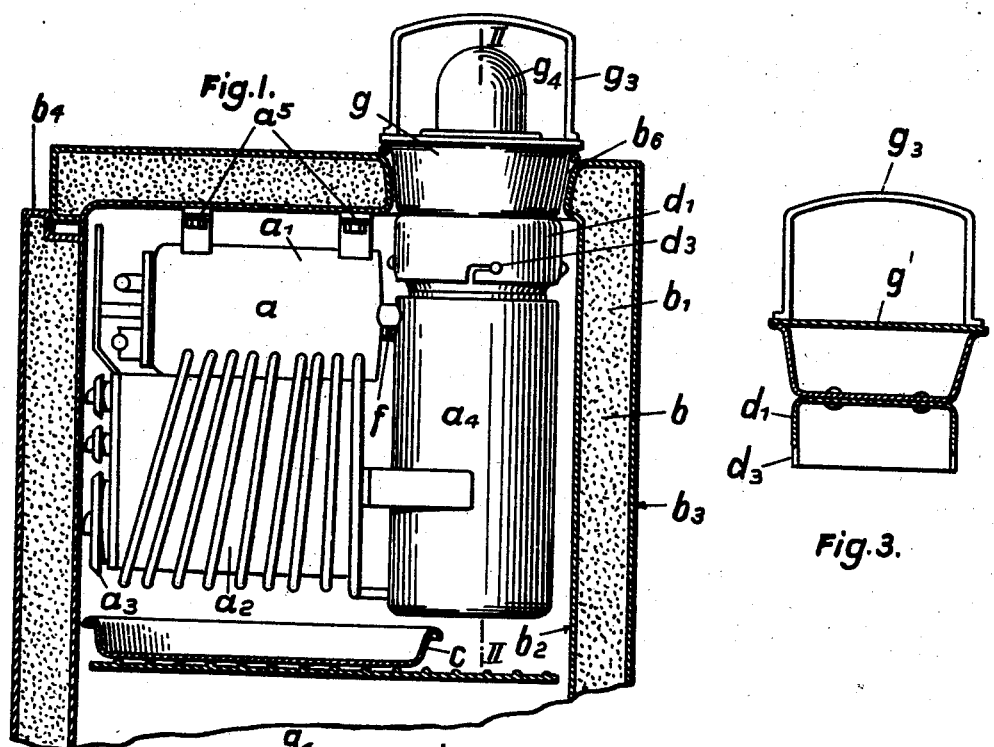
Fig. 1.
Fig. 3.
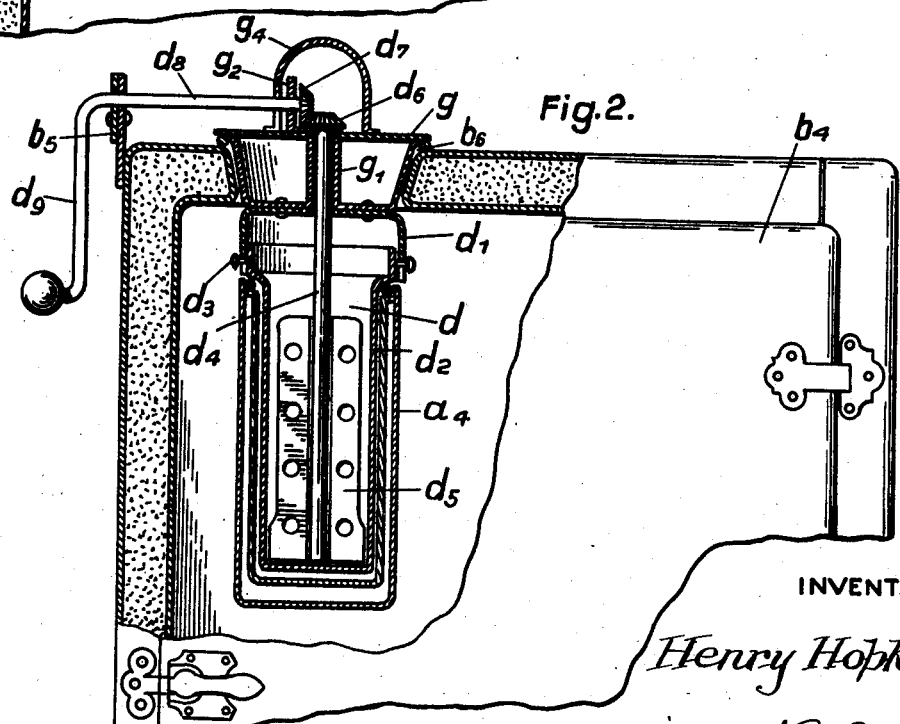
Fig. 2.
INVENTOR:
Henry Hopkes
William C. Linton
Atty.

Patented Mar. 27, 1934

1,952,985

UNITED STATES PATENT OFFICE 1,952,985

REFRIGERATOR

Henry Hopkes, Scharfenstein in Erzgebirge, Germany, assignor to Deutsche Kühl- und Kraftmaschinen G. m. b. H., Scharfenstein/Zschopautal, Germany Application October 29, 1932, Serial No. 640,306
In Germany November 20, 1931

3 Claims. (Cl. 62—114)

This invention relates to refrigerators provided with equipment for producing ice cream and with an ice generator, and particularly to refrigerators in which the cold is produced by the evaporation of a liquid.

One object of the invention is to provide for the suitable relative arrangement of the ice producer and ice cream freezer. Another object of the invention is to insure simultaneous effective cooling for both the ice cream freezer and the ice producer, especially in refrigerators in which cooling takes place by the evaporating refrigerating agent itself and a certain quantity of the liquid agent is present in the evaporator.

Still other objects of the invention will be apparent from the specification.

The nature of the invention and the manner of its performance will be better understood by referring to the accompanying drawing which illustrates a refrigerator provided with an ice cream freezer according to the invention and in which Figure 1 is a side view of the top portion of a refrigerator with evaporator and ice cream freezer, shown partly in section; Fig. 2, a side view at right angles to Fig. 1, partly in section on the line II—II, of Fig. 1; and Fig. 3, a sectional view of a cover without the agitator.

Referring to the drawing, $b$ are the walls of a refrigerator fitted with an ice cream freezer and containing a refrigerating plant of known type which operates by evaporating a liquid refrigerating agent, the drawing showing only the evaporator $a$ secured at $a_5$ to the upper wall of the refrigerator.

Below the evaporator $a$, a pan $c$ is disposed for collecting the condensed water precipitating from the air on the cold walls of the evaporator $a$ and for preventing it from dripping on articles kept in the refrigerator compartment underneath.

The walls $b$ of the refrigerator $a$ contain the insulating plates $b_1$ which, inside and outside, are protected against mechanical damage by the sheet of metal plates $b_2$, $b_3$. The doors $b_4$ similarly constructed as the walls $b$ render the inside of the refrigerator $a$ accessible in the usual way.

The evaporator $a$ is of the float type and always kept filled with a liquid refrigerating medium up to a certain level by means of a float, not shown. The evaporator $a$ contains the float member $a_1$ to the lower portion of which a ribbed member $a_2$ is connected in which the drawers $a_3$ are provided and adapted to receive the water required for producing ice. Beside the member $a_2$ a special evaporator member $a_4$ is positioned for cooling the ice cream freezer $d$.

The evaporator member $a_4$ normally communicates with the other parts of the evaporator $a$ by top and bottom pipes or the like and extends downwardly to approximately the lowest point of the evaporator, so that it is surrounded not only by the vapors of the refrigerating agent but also, like the ice generator, by the liquid agent. However, in order to wholly or partly stop cooling this part, the connecting pipings may be fitted with the valves $f$.

Above the member $a_4$, the upper wall of the evaporator $a$ has an opening $b_6$ normally closed by a cover $g$ which supports the parts of the ice cream freezer $d$. Below, the cover $g$ carries the hood $d_1$ serving as closure for the ice cream container $d_2$ and carrying it by means of the bayonet catch $d_3$ or a similar device.

The cover $g$ is fitted in its center with a guide sleeve $g_1$ which serves as bearing for the vertical shaft $d_4$ of the ice cream freezer. The shaft $d_4$ is provided at its lower end with the blades $d_5$ for mixing the ingredients of ice cream, and carries on top a bevel gear $d_6$ which is in mesh with a second bevel gear $d_7$ secured to the horizontal shaft $d_8$ carrying at its other end a hand crank $d_9$ for actuating the agitator.

The shaft $d_8$ arranged in the two bearings $g_2$, $b_5$, the bearing $g_2$, which may be of any suitable type, being secured in the cover $g$ while the bearing $b_5$ is of the tilting kind and attached to the wall $b$. When the bearing $b_5$ is turned up, the cover $g$ can be removed together with the agitator and the ice cream freezer. To facilitate removal the cover $g$ is fitted with the carrying member $g_3$. A cap $g_4$ secured to the cover $g$ protects the bevel gears $d_6$, $d_7$ against the entrance of dirt.

Besides the cover $g$, a second cover $g'$, as shown in Fig. 3, may be provided to replace the cover $g$. The cover $g'$ has no bushing $g_1$ and is used when the container of the freezer is to serve for keeping objects deposited therein well cooled or for producing raw ice therein instead of making ice cream.

While the invention has been shown and described with reference to one constructional embodiment thereof, it will be evident that modifications and changes may be made without departing from the spirit and scope of the invention.

I claim:—

1. In a refrigerator, a refrigerating plant wherein cooling is effected by the evaporation of a liquid refrigerating agent, said refrigerating plant comprising, in combination, an ice producer and an ice cream freezer disposed side by side, said ice producer comprising an evaporator part, said ice cream freezer comprising an evaporator part, an agitator and a vertical shaft on which said agitator is mounted, the evaporator part of said ice cream freezer being interconnected with that of the ice producer and extending substantially to the lowest point thereof, and means for actuating said agitator.

2. In a refrigerator, a refrigerating plant wherein cooling is effected by the evaporation of a liquid refrigerating agent, said refrigerating plant comprising, in combination, an ice producer and an ice cream freezer disposed side by side, said ice producer comprising an evaporator part, said ice cream freezer comprising an evaporator part, an agitator and a vertical shaft on which said agitator is mounted, the evaporator part of the ice cream freezer extending substantially to the lowest point of that of the ice producer, conduits interconnecting said evaporator parts, a liquid refrigerating agent of which a part is disposed in the lower portion of the evaporators during operation, one at least of said conduits being disposed below the level of said liquid, and means for actuating said agitator.

3. In a refrigerator, a refrigerating plant wherein cooling is effected by the evaporation of a liquid refrigerating agent, said refrigerating plant comprising, in combination, an ice producer and an ice cream freezer disposed side by side, said producer and freezer each comprising an evaporator part, conduits connecting said evaporator parts, a liquid refrigerant of which a part is disposed in the lower portion of the evaporators during operation, one at least of said conduits being disposed below the level of said liquid, the evaporator part of the ice cream freezer extending substantially to the lowest point of the ice producer, a vertical shaft extending into said ice cream freezer, an agitator on said shaft, a horizontal shaft provided with a hand crank, a gear connecting said vertical and horizontal shafts, an aperture above the said ice cream freezer in the upper wall of the refrigerator, a cover for closing said aperture, means on said cover for carrying said ice cream freezer and including a bearing in which said vertical shaft is guided and a second bearing in which said horizontal shaft is rotatably arranged, another bearing for said horizontal shaft being secured to said refrigerator, and means for opening said last-named bearing whereby said shaft may be removed therefrom.

HENRY HOPKES.